United States Patent
Nair et al.

(10) Patent No.: US 11,531,887 B1
(45) Date of Patent: Dec. 20, 2022

(54) DISRUPTIVE PREDICTION WITH ORDERED TREATMENT CANDIDATE BINS

(71) Applicant: Amazon Technologies, Inc., Seattle, WA (US)

(72) Inventors: Naveen Sudhakaran Nair, Issaquah, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 503 days.

(21) Appl. No.: 16/750,381

(22) Filed: Jan. 23, 2020

(51) Int. Cl.
*A47G 27/04* (2006.01)
*G06N 3/08* (2006.01)

(52) U.S. Cl.
CPC ..................... *G06N 3/08* (2013.01)

(58) Field of Classification Search
CPC ........................................................ G06N 3/08
USPC ........................................ 706/12, 15, 25, 46
See application file for complete search history.

(56) References Cited

U.S. PATENT DOCUMENTS

| 11,042,838 | B1* | 6/2021 | Xiong | H04N 7/181 |
| 2010/0223212 | A1* | 9/2010 | Manolescu | G09B 7/00 |
| | | | | 706/46 |
| 2013/0198172 | A1* | 8/2013 | Torrens | G06Q 30/02 |
| | | | | 707/722 |
| 2017/0220760 | A1* | 8/2017 | Fonte | G06F 17/10 |
| 2019/0355269 | A1* | 11/2019 | Pan | H04L 67/306 |
| 2020/0050330 | A1* | 2/2020 | Schilling | G06N 20/00 |
| 2020/0065772 | A1* | 2/2020 | Whitehead | G06Q 10/1053 |
| 2020/0342332 | A1* | 10/2020 | Neumann | G06V 10/774 |
| 2020/0380036 | A1* | 12/2020 | van Bochove-Gutierrez | |
| | | | | G06F 40/216 |
| 2021/0065914 | A1* | 3/2021 | Martinez | G16H 10/60 |
| 2021/0397996 | A1* | 12/2021 | Neumann | G06N 20/00 |
| 2022/0189205 | A1* | 6/2022 | Shibata | G06V 40/70 |
| 2022/0192527 | A1* | 6/2022 | LeBoeuf | A61B 5/02416 |

* cited by examiner

*Primary Examiner* — Thuy N Pardo
(74) *Attorney, Agent, or Firm* — Kilpatrick Townsend & Stockton LLP

(57) ABSTRACT

Prediction of outcomes of disruptive treatments are enabled utilizing sequenced training of a machine learning model over ordered bins of treatment candidates. Treatment candidates may be assigned to candidate characterization bins with an ordering, and the model may be trained with a sequence of training steps corresponding to the ordering of the candidate characterization bins, in each training step the model having untreated candidate features from a corresponding bin and aggregate metrics from one or more previous steps as input. The predicted outcome for a selected bin may be generated with the trained model having treated candidate features and aggregate metrics from one or more previous steps as input. The predicted outcome may be a counterfactual prediction for a bin with insufficient control candidates, and may represent a nonlinear extrapolation from control data in prior bins in the bin ordering.

20 Claims, 8 Drawing Sheets

DISRUPTIVE PREDICTION WITH ORDERED TREATMENT CANDIDATE BINS

BACKGROUND

With the advent of computers, prediction and forecasting has become a widespread and useful tool. However, a typical shortcoming of conventional forecasting methods is a need to wait for sufficient data to be gathered before the forecasts attain acceptable levels of accuracy. Often, early decisions in a product or service lifecycle are significant, e.g., gauging user sentiment in the immediate wake of a product or service launch, but conventional forecasting cannot provide estimates with sufficient accuracy to be helpful.

Conventional A/B testing can provide information in this scenario, however, there are common circumstances that prevent the use of this tool. For example, A/B testing might require randomly prohibiting user participation in the launch of an exciting new product or service, or randomly adjusting launch pricing. In this case the A/B testing itself could cause significant negative sentiment, which is undesirable. Separately, users who voluntarily participate in product and service launches (sometimes called "early adopters") can be non-representative of the user base as a whole, making comparisons and impact analysis difficult.

BRIEF DESCRIPTION OF THE DRAWINGS

Various embodiments in accordance with the present disclosure will be described with reference to the drawings, in which.

DETAILED DESCRIPTION

Figure 1:
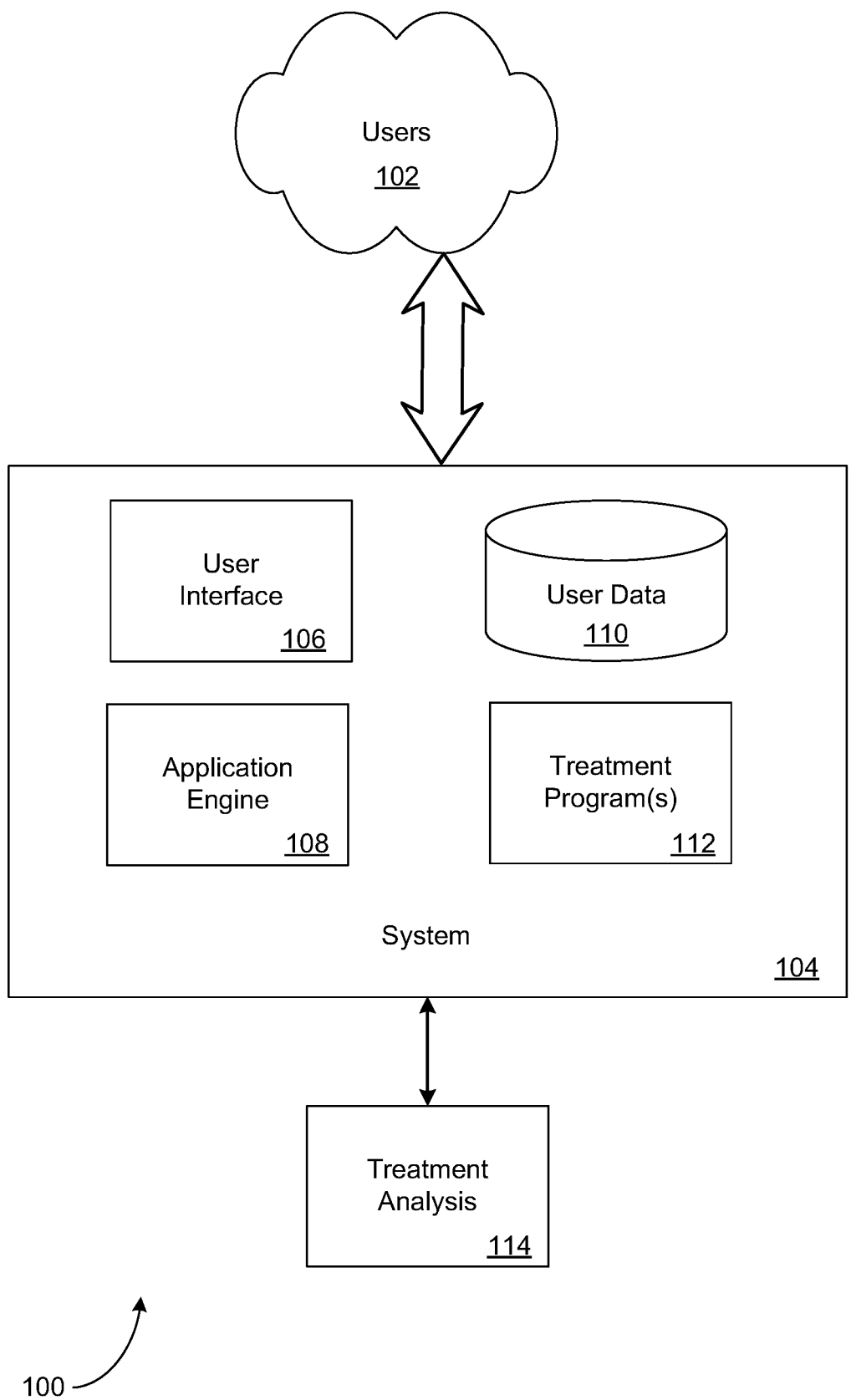
FIG. 1 is a schematic diagram depicting an example computing environment in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In accordance with at least one embodiment, prediction of outcomes of disruptive treatments are enabled utilizing sequenced training of a machine learning model over ordered bins of treatment candidates. As the terms are used herein, "treatments" are applied to "treatment candidates" in an attempt to achieve "treatment outcomes." "Disruptive treatments" refer to treatments in an early 'disruptive' phase during which there is insufficient data to support conventional predictive methods such as linear extrapolation. For example, there may be too few 'candidates' may have become actually treated. As another example, AB testing to build a pool of similar 'control' (e.g., untreated) candidates may be prohibited, treatment may be by invite-only and/or early adopters may be sufficiently non-representative of the general candidate population for a sufficient pool of similar control candidates to exist. In accordance with at least one embodiment, treatment candidates may be assigned to candidate characterization bins with an ordering, and a machine learning model may be trained with a sequence of training operations corresponding to the ordering of the candidate characterization bins (may undergo "sequence training"), in each training operation the model having untreated candidate features from a corresponding bin and aggregate metrics from one or more previous training operations as input. The predicted outcome for a selected bin may be generated with the trained model having treated candidate features and aggregate metrics from one or more previous training operations as input. In accordance with at least one embodiment, the predicted outcome is a counterfactual prediction for a bin with insufficient control candidates, and represents a nonlinear extrapolation from control data in prior bins in the bin ordering. In effect, the technique may simulate the missing control candidates using information from the prior bins.

As an example, the treatment candidates may be users of a service, and the treatment may be ordering and/or purchase of an expensive new device to participate in a new aspect of the service. The outcome of interest is the level of revenue associated with users who have purchased the device compared to the users who have not purchased the device. The launch of the expensive device is a strategic initiative, so conventional AB testing is unavailable. Unfortunately the price of the device means that early adopters are non-representative of the user base as a whole, so conventional linear extrapolation isn't helpful. In accordance with at least one embodiment, the users may be partitioned into propensity bins (e.g., propensity to purchase such a device as determined by past purchase history), and the bins ordered by propensity. At higher propensities, there may be insufficient control users for accurate predictions (e.g., most high propensity users purchase the device). In accordance with at least one embodiment, to increase the prediction accuracy for a high propensity bin, a machine learning model (e.g., a recurrent neural network or RNN) may be trained, in bin order, using control user features and outcomes from lower propensity bins, with aggregate predicted output metrics from prior bins in the bin order being used as input as well to provide information from lower propensity training operations to higher propensity training operations. Once the model is trained, the higher accuracy prediction for the high propensity bin may be obtained using the model but inputting treated user features and aggregate predicted outcome metrics from the prior bin in the bin order.

In accordance with at least one embodiment, to control for the difference in behavior of exposed and non-exposed users, the counterfactual can be constructed using a causal analysis algorithm that uses user features (e.g., behavior features) prior to an exposure period to account for the difference. For example, a conventional user matching technique may result in grouping exposed and non-exposed in different groups, making it difficult or impossible to do analysis for a major set of exposed users. The same problem can persist for distance-based matching such as LSH, Euclidean, etc.

One naïve workaround for the limitation is by using linear regression on non-matching control population to build the baseline prediction model and score the treatment users/features using the model. Since linear regression is capable of extrapolating, the model can estimate the impact of treatment with no matching controls (with some assumptions). However, the assumption that the linear extrapolation is correct is strong. Accordingly, it is common to filter out treatment users who do not have a matching control from the analysis, where distance metrics such as similarity score, LSH, Mahalanobis distance, etc. are used for identifying matches.

In accordance with at least one embodiment, some problems can be addressed by extrapolating in a nonlinear fashion. In accordance with at least one embodiment, sequence models may be used for nonlinear extrapolation as described in more detail below.

In accordance with at least one embodiment, an analysis module may identify finer propensity bins for treatment candidates (both exposed and non-exposed). For treatments that have a sufficient number of matching controls in propensity bins, in accordance with at least one embodiment, conventional methods can be utilized to estimate the impact at bin level.

In accordance with at least one embodiment, to compensate for the insufficient number of control treatment candidates in an identified high propensity bin, the propensity bins may be arranged as a sequence. For example, bin with probability between 0-0.1 as first instance of sequence, 0.1-0.2 as second instance and so on. In accordance with at least one embodiment, the features as well as the baseline outcome variable tend to change in a nonlinear fashion from low propensity bins to high propensity bins.

For the identified high propensity bin, in accordance with at least one embodiment, the analysis module may identify previous bins in the sequence and remove treatments in those previous bins (e.g., remove non-control treatment candidates).

An RNN is trained such that, along with the features of each control treatment candidate in the bin/training operation, aggregate statistics of outcome variables in the previous bin may be utilized. For example, in one sequence operation the input may be: features of each control treatment candidate in the bin and the average (and/or percentiles) of outcome predictions in the previous bin. And one sequence operation output may be: predictions for each control treatment candidate in the bin. The true labels may be the outcome variable value for these control treatment candidates.

In accordance with at least one embodiment, this way of modeling can help to capture the pattern in which the outcome variable changes (given features) as the propensity score increases.

Once the RNN is trained using the previous bins (using control treatment candidates), the identified high propensity bin is added as the last operation of the sequence. The sequence may be scored (e.g., the trained model applied) such that the last bin that has treated treatment candidates (and treatment features) gets the counterfactual prediction for treated (given features). In accordance with at least one embodiment, the prediction is after considering the features as well as the sequence/structure information identified by the model.

In accordance with at least one embodiment, the prediction by the sequence model for the identified high propensity bin gives the outcome of treated in that bin if they were not treated (e.g., it is a counterfactual prediction). In accordance with at least one embodiment, this extrapolates nonlinearly with respect to features and the outcome trend identified from the propensity bin sequence.

Having introduced some relevant concepts, the description now turns to the figures. FIG. 1 depicts an example computing environment 100 in accordance with at least one embodiment. In the computing environment 100, users 102 interact with a system 104 via a user interface 106 to access application functionality provided by an application engine 108. During the interactions, the users 102 generate user data 110. During the user interactions, one or more treatment programs 112 may be active. The treatment programs 112 may monitor, modify, initiate and/or end user interactions in accordance with one or more outcome goals.

For example, the system may be a service provider, and the application engine 108 may implement the service at least in part with a graphical user interface that is part of the user interface 106. As the users 102 interact with the service, for example, placing service requests and/or orders and receiving service responses, and otherwise interacting with the service, each user may generate an activity history that is stored in the user data store 110. The user data 110 may also store user account details and any suitable user-related data. In this example, it may be a goal of a system operator to increase user engagement with the service (e.g., activity levels), to have users increase the number of services they use, and/or to have users begin to use a premium service. To achieve these goals, the system operator may establish one or more treatment programs 112 having such goals as their desired treatment outcomes.

Treatment programs 112 can represent large investments including the launch of new products and services. Continuing the "expensive new device" example from above, the treatment program 112 may be the purchase of the device (e.g., via the service) and an outcome of interest may be a resulting level of service usage (e.g., as represented by user spending) in a particular time period after purchase (e.g., during the following 6 months). There may be more than one outcome variable associated with a particular treatment program. Other example outcome variables include a level of user behavior of a particular type, an aggregate statistic associated with user behavior of a particular type during a particular time period, revenue associated with user behavior, profit associated with user behavior, or a level of user sentiment (e.g., as determined via conventional sentiment analysis).

As described above, the expense of the device means that conventional prediction techniques are not applicable. However, a treatment analysis service 114 can provide more accurate predictions in accordance with at least one embodiment.

Figure 2:
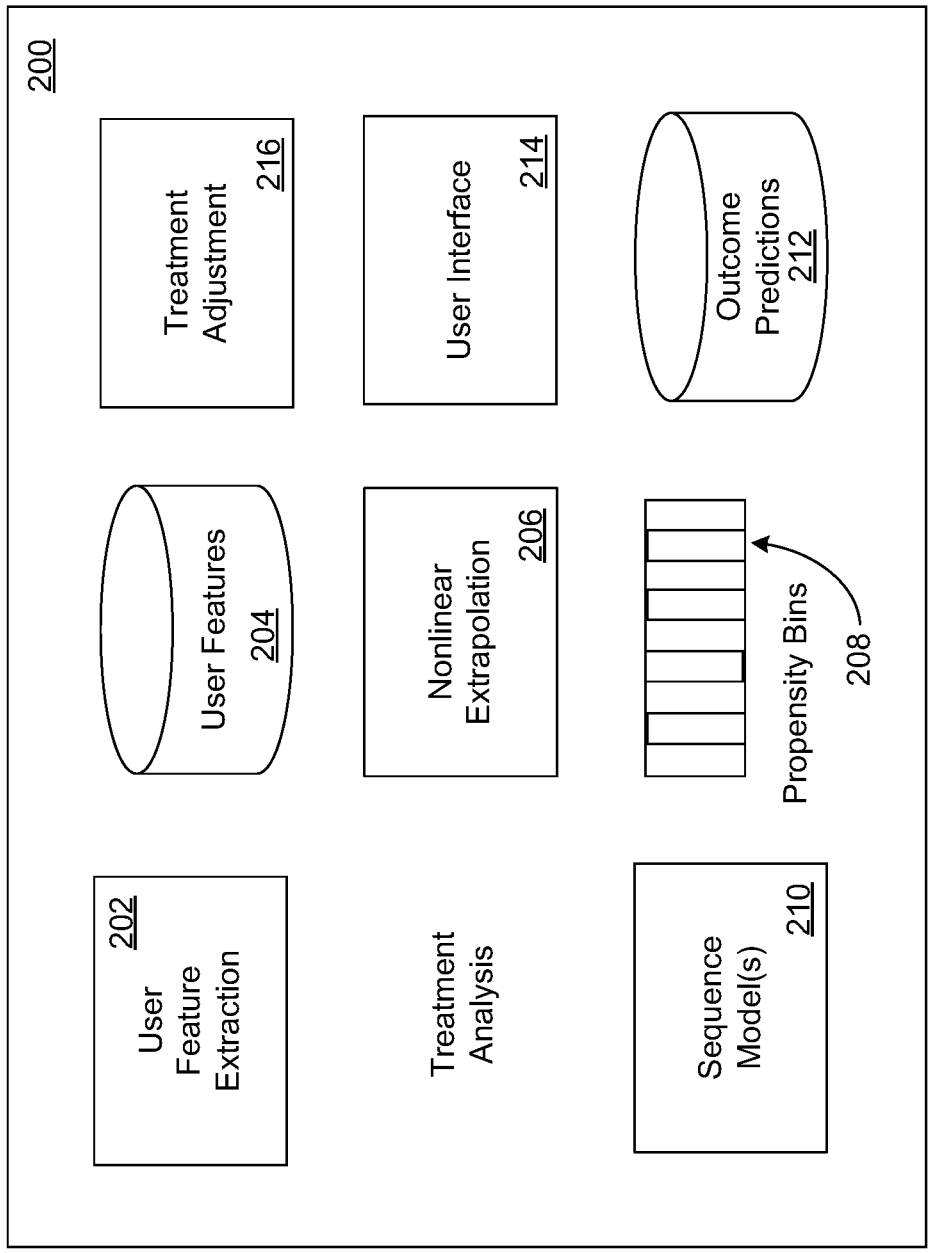
FIG. 2 is a schematic diagram depicting an example treatment analysis service in accordance with at least one embodiment.

FIG. 2 depicts an example treatment analysis service 200 in accordance with at least one embodiment. The treatment analysis service 200 of FIG. 2 is an example of the treatment analysis service 114 of FIG. 1. The treatment analysis service 200 may include a user feature extraction module 202 configured to extract user features, for example, from user data 110 of FIG. 1. The extracted user features may be stored in a user features store 204. The user features extraction module 202 may extract any suitable user feature. Examples of suitable user features includes geographic, demographic, psychographic and behavioral features.

The treatment analysis service 200 may further include a nonlinear extrapolation module 206. The nonlinear extrapolation module 206 may utilize extracted user features 204 to determine propensity scores for users (e.g., propensity for particular users to participate in particular treatments based at least in part on a propensity scoring function taking user feature values), and then partition the user population into propensity bins 208 according to their propensity scores. Although for clarity this example and others throughout the disclosure uses users and user propensity to create the propensity bins 208, this technique is more generally applicable. For example, treatments may be applied to any suitable treatment candidate, not necessarily users of a service, and any suitable candidate characterization score may be utilized to partition the treatment candidates into candidate characterization bins. Any suitable metric may be substituted for the propensity metric including distance metrics and/or any suitable metric for which an ordering can be defined. For example, in a feature space (e.g., of user features), Euclidean distance from a centroid of some set of users (e.g., all or some control or treated users) may be utilized as a basis to partition users. The more general terms may be substituted throughout the description where suitable.

Rather than building a machine learning model for each propensity bin, in accordance with at least one embodiment, a single machine learning model is trained using data from multiple propensity bins. That is, the model is trained as a "sequence model" 210 to capture the relationship between propensity bins and to propagate information from lower propensity bins to higher propensity bins. The machine learning model utilized by the nonlinear extrapolation module 206 may include any suitable machine learning model and/or algorithm. Examples of suitable machine learning models include artificial neural networks, decision trees, support vector machines, regression analysis, Bayesian networks and genetic models. Examples of suitable machine learning algorithms include supervised learning, unsupervised learning, reinforcement learning, self learning, feature learning, sparse dictionary learning, anomaly detection, and association rules. Training may include a federated learning procedure.

As described below in more detail with reference to FIG. 3, the nonlinear extrapolation module 206 may arrange the propensity bins 208 in a sequence (or more generally, an ordering) from lower propensity bins to higher propensity bins according to propensity score ranges associated with each bin (e.g., according to a maximum propensity score in each bin). A particular propensity bin in the sequence may be identified as requiring a sequence model for accurate prediction. For example, the identified propensity bin may have insufficient control users to enable conventional outcome determination. A sequence model may then be trained using data from propensity bins prior in the sequence to the identified propensity bins, as described below in more detail with reference to FIG. 4, and used to generate outcome predictions 212 for the identified propensity bin. Such outcome predictions may include determining predicted outcome changes when undergoing treatments.

Enhanced outcome predictions 212 may be provided for presentation, for example, with a user interface 214. In accordance with at least one embodiment, a treatment adjustment module 216 may automatically adjust one or more treatment programs 112 (FIG. 1) based at least in part on the generated outcome predictions 212. For example, the treatment adjustment module 216 may adjust a treatment program parameter based at least in part on a corresponding outcome prediction exceeding a threshold and/or changing by an amount that exceeds a rate threshold. Treatment program parameters managed by the treatment adjustment module 216 may include any adjustable treatment program parameter such as treatment frequency and treatment amount.

Figure 3:
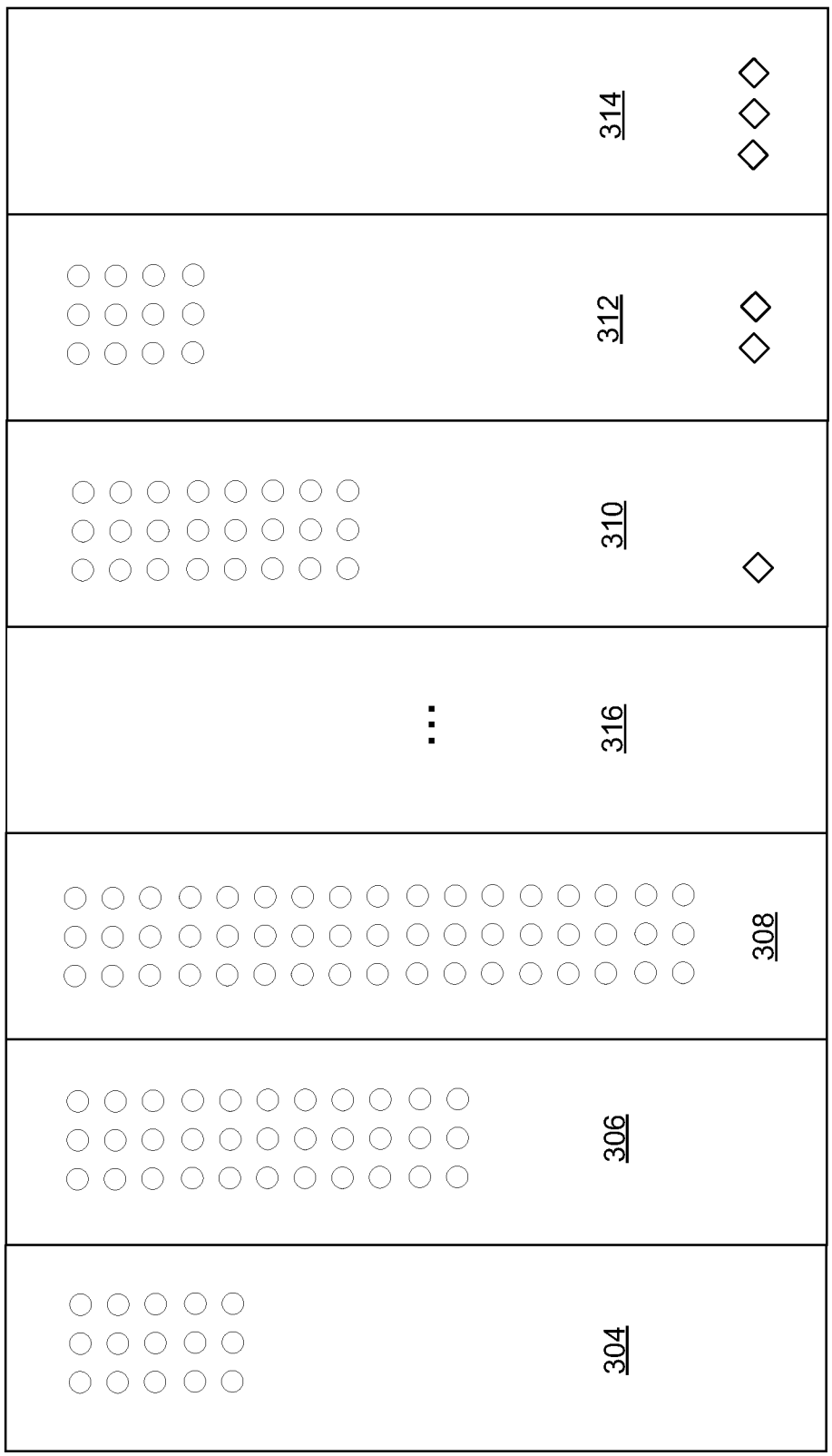
FIG. 3 is a schematic diagram depicting an example arrangement of candidate characterization bins in accordance with at least one embodiment.

FIG. 3 depicts an example arrangement of candidate characterization bins 300 in accordance with at least one embodiment. The propensity bins 208 of FIG. 2 are an example of the candidate characterization bins 300 of FIG. 3. In this example, six bins 304, 306, 308, 310, 312, 314 are shown separated by a placeholder 316 containing an ellipsis. As is conventional, the ellipsis indicates that the arrangement 300 may include any suitable number of bins including fewer bins. In this example, control treatment candidates are represented by circles, while treated candidates are represented by diamonds. Bins 304, 306, 308, 310, 312 contain control candidates in varying amounts. Bins 310, 312, 314 contain treated candidates in varying amounts.

In this example, a candidate characterization score has been determined for each treatment candidate (e.g., a propensity score based on user feature values and/or a likelihood that the treatment candidate will undergo treatment), and the candidates have been assigned into corresponding bins. For example, bin 304 may be assigned candidates with scores between 0.0 and 0.1, bin 306 may be assigned candidates with scores between 0.1 and 0.2, and so on. This example is intended to be representative of a disruptive treatment, in which the treatment candidates with the highest characterization scores are most likely to be treated and also least likely to have matching control candidates (e.g., matching according to candidate features). Accordingly, the highest scoring bin 314, which may, for example, contain candidates with scores between 0.9 and 1.0, contains treated candidates but no matching control candidates. Since bin 314 has insufficient control candidates, it may be identified as a bin requiring nonlinear extrapolation using a machine learning model trained on a sequence of the lower scoring bins 304, 306, 308, 310, 312, for example, as described below in more detail with reference to FIG. 4.

Figure 4:
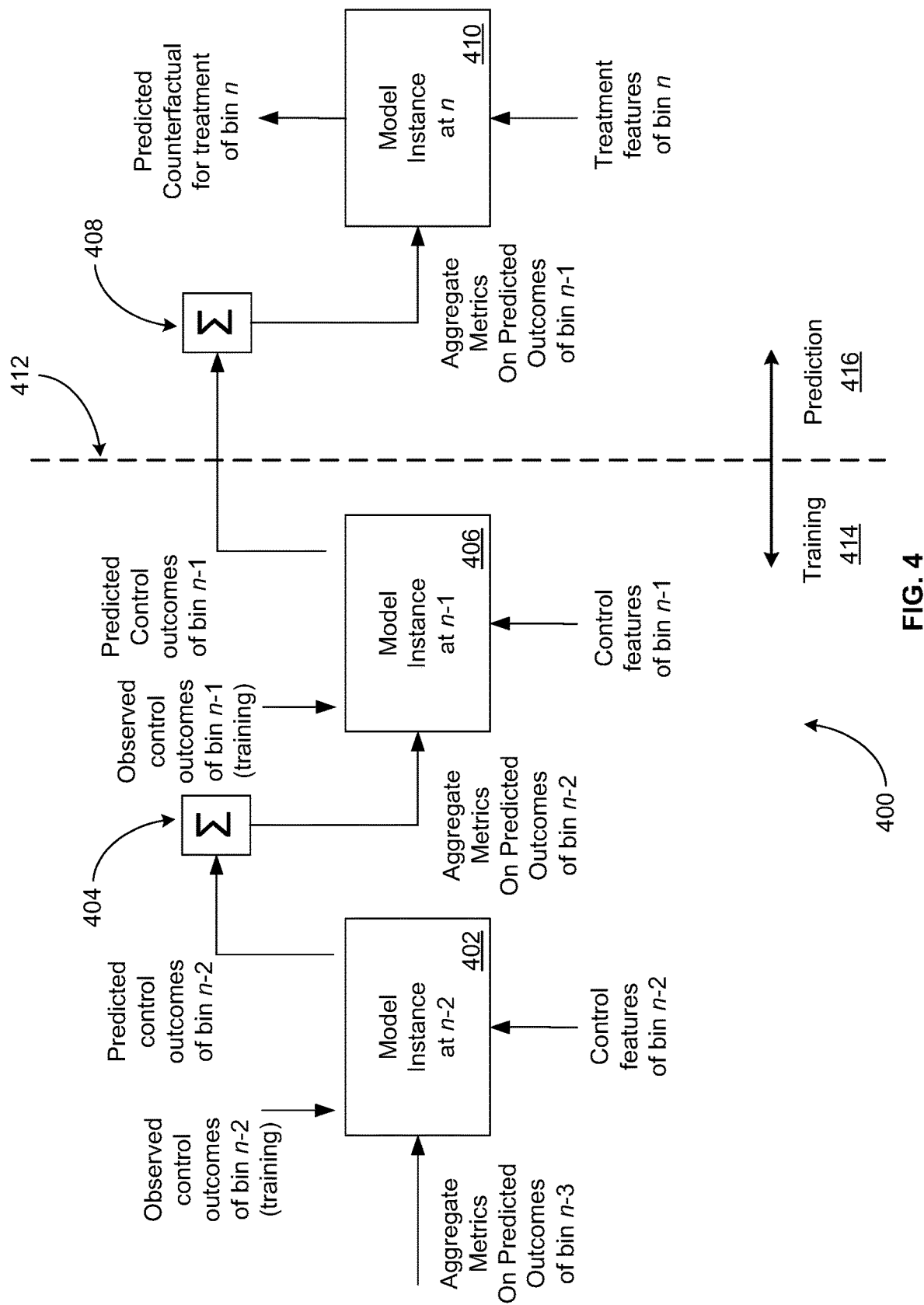
FIG. 4 is a data flow diagram depicting example data flows during a model training sequence in accordance with at least one embodiment.

FIG. 4 depicts example data flows during a model training sequence 400 in accordance with at least one embodiment. In this example, the bins 304, 306, 308, 310, 312, 314 of FIG. 3 are arranged in an ordered sequence 1, 2, . . . , n−2, n−1, n based on score ranges associated with each bin. For example, the bins may be strictly ordered according to the maximum score contained by each bin. In this example, the $n^{th}$ bin corresponds to bin 314 of FIG. 3. This is the bin that has been selected for nonlinear extrapolation. A machine learning model (e.g., a recurrent neural network) is trained using data from bins earlier in the sequence, e.g., bins 1, 2, . . . , n−2, n−1. In contrast to some conventional procedures, a single machine learning model (a sequence model) may be trained for the selected bin using data from bins earlier in the sequence. Although multiple sequence models corresponding to multiple selected bins may be trained, different models need not be trained for each bin in the sequence.

The sequence training aspect of the procedure 400 is depicted in FIG. 4. The model is trained using data from each bin in the sequence as well as aggregate predicted outcome data from prior bins in the sequence. For example, sequence position n−2 may correspond to bin 310 (FIG. 3). The model instance 402 in this training operation n−2 may be trained using features of control candidates in bin 310, as well as aggregate metrics on predicted outcomes of a previous bin (e.g., bin sequence position n−3). If there is no previous bin in the sequence, the aggregate metrics may be a zero or null equivalent. The training may utilize observed control outcomes for candidates in bin 310. However, in accordance with at least one embodiment, the training filters out data associated with treated candidates (represented by diamonds) since the model will ultimately be used to predict simulated control candidates. While candidate features vary by candidate, aggregate metrics are the same for each candidate.

The model instance 402 of training operation n−2 may be utilized to generate predicted control outcomes (e.g., outcomes for the control candidates) and an aggregator 404 may generate aggregate predicted outcomes for passing to the next training operation n−1.

Similarly, the model instance 406 at training operation n−1 may be trained using features of control candidates in the next bin in the training sequence, that is, bin 312 (FIG. 3) in this example, as well as the aggregate metrics provided by the aggregator 404. Again, the training may utilize observed control outcomes for candidates in bin 312, but filter out data associated with treated candidates. Aggregator 408 may generate aggregate metrics to provide to an evaluation operation of the procedure 400. The aggregators 404, 408 may generating any suitable aggregate metrics for the predicted outcomes, for example, a statistical summary of predicted outcome values, a mean of predicted outcome values, a median of predicted outcome values, percentiles associated with predicted outcome values, or a standard deviation of predicted outcome values. Each training operation 1, . . . , n−2, n−1, is a training epoch in the training of a sequence model. During the training of the sequence model, the machine learning model (e.g., sequence model 210 of FIG. 2) is updated in each training epoch. A distinct instance of the machine learning model may be updated in each training epoch.

Using mathematical notation: suppose the bin selected for nonlinear extrapolation is the $n^{th}$ bin. The sequence model $M(x_{ij}, a(j-1))$ is trained for each bin j in $\{1, \ldots, n-1\}$ where $x_{ij}$ is a control user feature vector for user i in the $j^{th}$ bin, and $a(j-1)$ represents an aggregate metric vector utilizing aggregate metrics from at most the $(j-1)^{th}$ bin. Then $y_{in}=M(x_{in}, a(n-1))$ provides an outcome prediction for user i in the selected bin n.

Having been trained in training operations 1, . . . , n−2, n−1, the model instance 410 (the trained sequence model) is ready for use in generating a counterfactual prediction for the treated candidates of bin n (e.g., bin 314 of FIG. 3). The trained model 410 uses features of treated candidates in bin n of the bin sequence, as well as aggregate metrics provided by aggregator 408 to generate the counterfactual prediction, e.g., the predicted outcomes for the treated candidates if they had been control candidates, in essence simulating or providing the missing control candidates in bin n, so that outcome impact (e.g., outcome change between control and treated candidates) can be more accurately determined. Operations to the left of dashed line 412 (e.g., related to model instances at n−1, n−2, . . . , 1) are part of a sequence model training phase 414. Operations to the right of dashed line 412 are part of a prediction phase 416 that utilizes the sequence model trained in the training phase 414 to make one or more predictions (e.g., with trained sequence model instance 410).

In the examples of FIGS. 3 and 4, the bins 304, 306, 308, 310, 312, 314 are depicted as a strictly ordered partition arranged into a sequence that utilizes each of the bins 304, 306, 308, 310, 312, 314. However, each embodiment is not so limited. The bins need not be a strict partition (e.g., overlapping is permitted), the ordering need not be so strict, particularly as the number of bins grows large and/or the candidate characterization score is not simple (e.g., is not a one dimensional real value). In addition, the correspondence between the training sequence and the bin sequence need not be strictly in the same order and/or one-to-one. In accordance with at least one embodiment, variations in these aspects can be utilized to smooth out effects of spurious data.

In the examples of FIGS. 3 and 4, bin 314 of FIG. 3 is selected as bin n of the procedure because it has insufficient matching control candidates. It is not necessary that a bin have no matching control candidates to qualify (e.g., bins 310 and 312 may qualify), and more than one bin in a sequence may qualify, for example, conventional tests for statistical significance may be utilized to qualify bins for the nonlinear extrapolation procedure. Qualifying bins can occur at any suitable position in the sequence except the first position. In addition, bins that do not qualify may be evaluated with the procedure as part of estimate validation (e.g., the nonlinear prediction may be compared to a conventional prediction using error metrics such as root mean square error). The procedure may be applied to any suitable bin. A bin need not qualify, explicitly or otherwise, for the procedure to be applied and generate a valid result.

Figure 5:
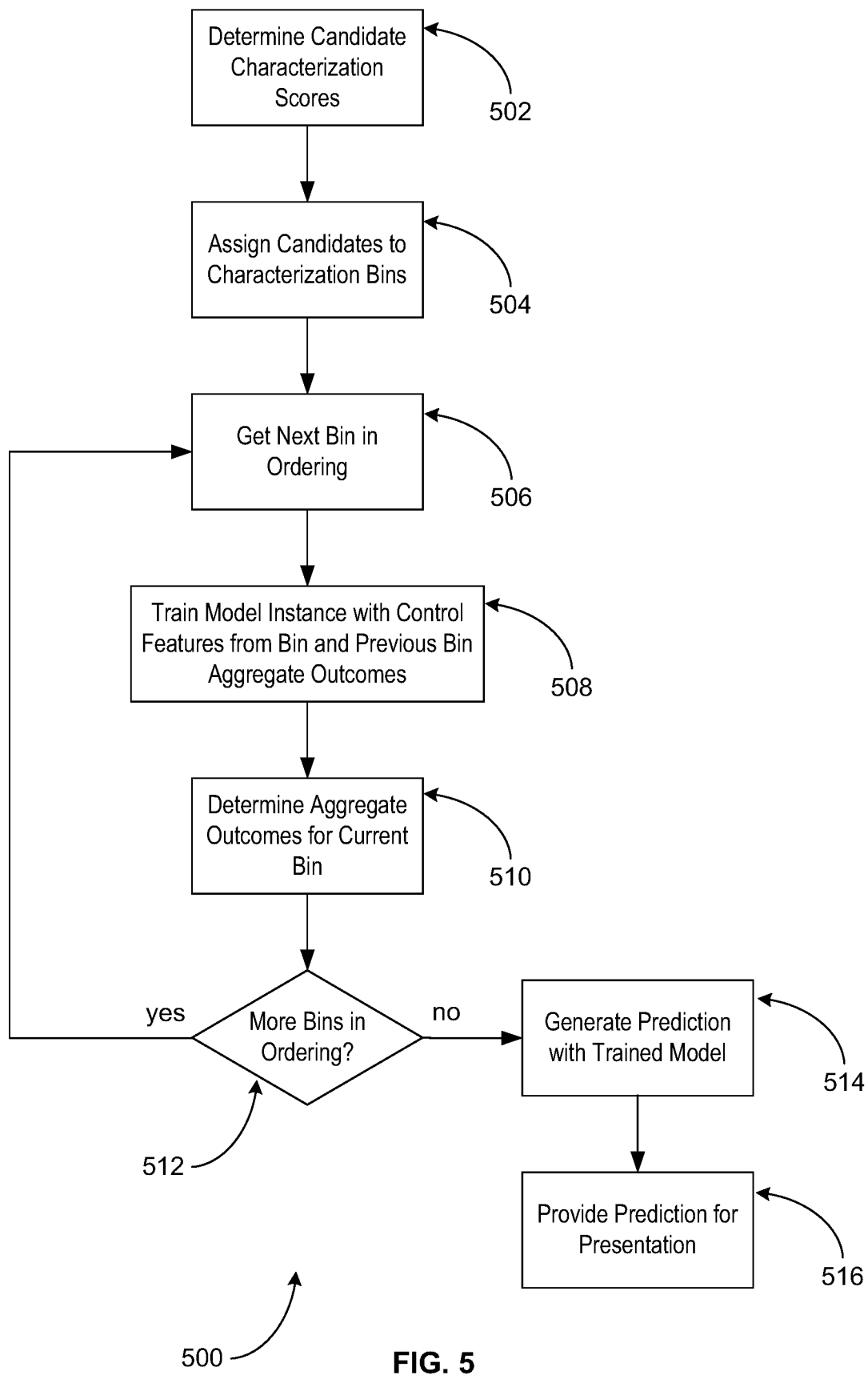
FIG. 5 is a process diagram depicting example operations for nonlinear extrapolation in accordance with at least one embodiment.

The description now turns to procedures that may be performed in accordance with at least one embodiment. FIG. 5 depicts example operations for nonlinear extrapolation in accordance with at least one embodiment.

At 502, candidate characterization scores may be determined. For example, the nonlinear extrapolation module 206 (FIG. 2) may determine candidate characterization scores for treatment candidates based at least in part on candidate features. At 504, candidates may be assigned to candidate characterization bins. For example, the nonlinear extrapolation module 206 may determine a set of candidate characterization bins 300 (FIG. 3) and assign the candidates to the bins 300 based at least in part on the candidate's characterization score determined at 502. Individual characterization bins 304, 306, 308, 310, 312, 314 may be associated with a score range including a score minimum and score maximum.

At 506, a next (or a first) bin in a bin ordering may be identified. For example, the nonlinear extrapolation module 206 (FIG. 2) may determine an ordering of the candidate characterization bins 300 (FIG. 3) based at least in part on their associated score ranges and/or corresponding candidate characterization scores of the treatment candidates assigned to the candidate characterization bins, and the process 500 may set the current bin to a next bin in the ordering. At 508, a machine learning model instance associated with the current bin may be trained utilizing observed outcomes of untreated treatment candidates in the corresponding candidate characterization bin to update the machine learning model given input including (i) features of the untreated treatment candidates and (ii) an aggregate metric on predicted outcomes generated by the machine learning model in a prior training operation of the sequence of training operations. For example, the model instance 402 may be identified as the current instance in the training sequence and trained as described above with reference to FIG. 4. At 508, aggregate outcomes for the current bin may be determined. For example, the aggregator 404 may generate aggregate metrics as described above with reference to FIG. 4.

At 512, it may be determined whether there are more bins in the ordering. If so, the procedure 500 may progress to 506 to identify the next bin in the ordering. If not, the procedure 500 may progress to 514. At 514, a prediction may be generated with the trained model, for example, the trained model instance 410 may be utilized to generate the prediction as described above in more detail with reference to FIG. 4, for example, using the trained machine learning model given input including (i) features of treated treatment candidates of the selected candidate characterization bin and (ii) an aggregate metric on predicted outcomes generated by the machine learning model in a training operation of the sequence of training operations. At 516, the prediction generated at 514 may be provided for presentation. For example, the nonlinear extrapolation module 206 (FIG. 2) may provide an outcome prediction 212 to the user interface 214.

Figure 6:
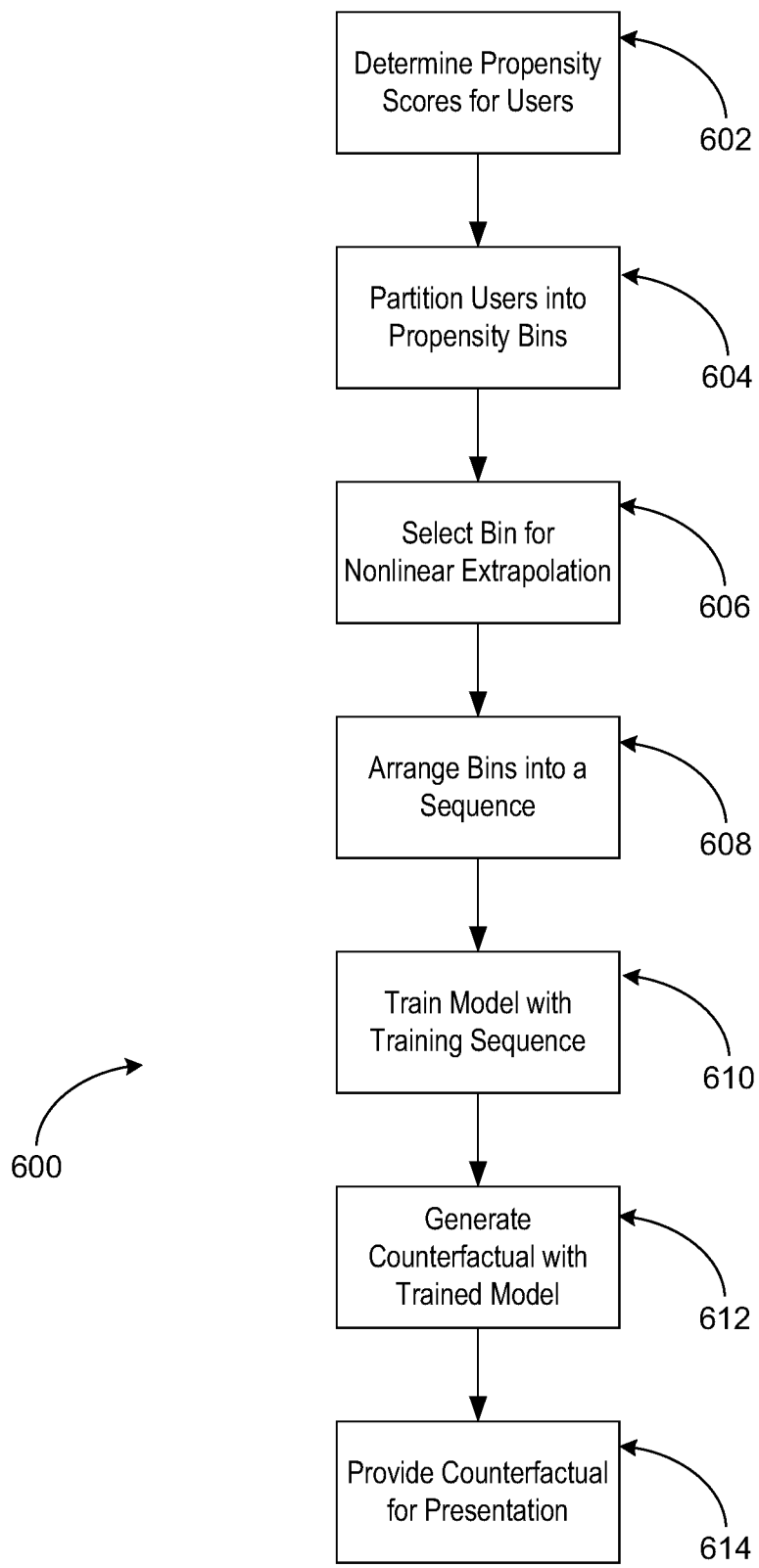
FIG. 6 is a process diagram depicting further example operations for nonlinear extrapolation in accordance with at least one embodiment.

FIG. 6 depicts further example operations for nonlinear extrapolation in accordance with at least one embodiment. At 602, propensity scores may be determined for users. For example, the nonlinear extrapolation module 206 (FIG. 2) may determine propensity scores based at least in part on user features 204. At 604, users may be partitioned into propensity bins. For example, the nonlinear extrapolation module 206 may partition the possible range of propensity scores into a plurality of bins 208, each bin being associated with a propensity score range including a minimum score and a maximum score, and each user may be assigned to a propensity bin based at least in part on the propensity scores determined at 602, e.g., such that the user's propensity score is within the bin's associated score range.

At 606, a propensity bin may be selected for nonlinear extrapolation. For example, the nonlinear extrapolation module 206 (FIG. 2) may determine that bin 314 (FIG. 3) should be selected because it has insufficient matching control users in the bin (e.g., a number of matching control users based on user features is less than a threshold number). At 608, the propensity bins may be arranged in a sequence. For example, the nonlinear extrapolation module 206 may arrange the propensity bins 208 into a sequence based at least in part on the score range associated with each bin (e.g., strictly ordered based on a bin's score maximum). At 610, a machine learning model may be trained with a training sequence, for example, as described above in more detail with reference to FIG. 4 and/or as described below in more detail with reference to FIG. 7.

At 612, the trained model may be utilized to generate a counterfactual prediction. For example, the trained model instance 410 may be utilized to generate the counterfactual predication as described above with reference to FIG. 4, for example, using the trained machine learning model given input including (i) features of treated users of the selected propensity bin and (ii) an aggregate metric on predicted outcomes generated by the machine learning model in a training operation of the sequence of training operations. At 614, the counterfactual prediction may be provided for presentation. For example, the nonlinear extrapolation module 206 (FIG. 2) may cause a counterfactual prediction in the outcome predictions 212 to be presented with the user interface 214.

Figure 7:
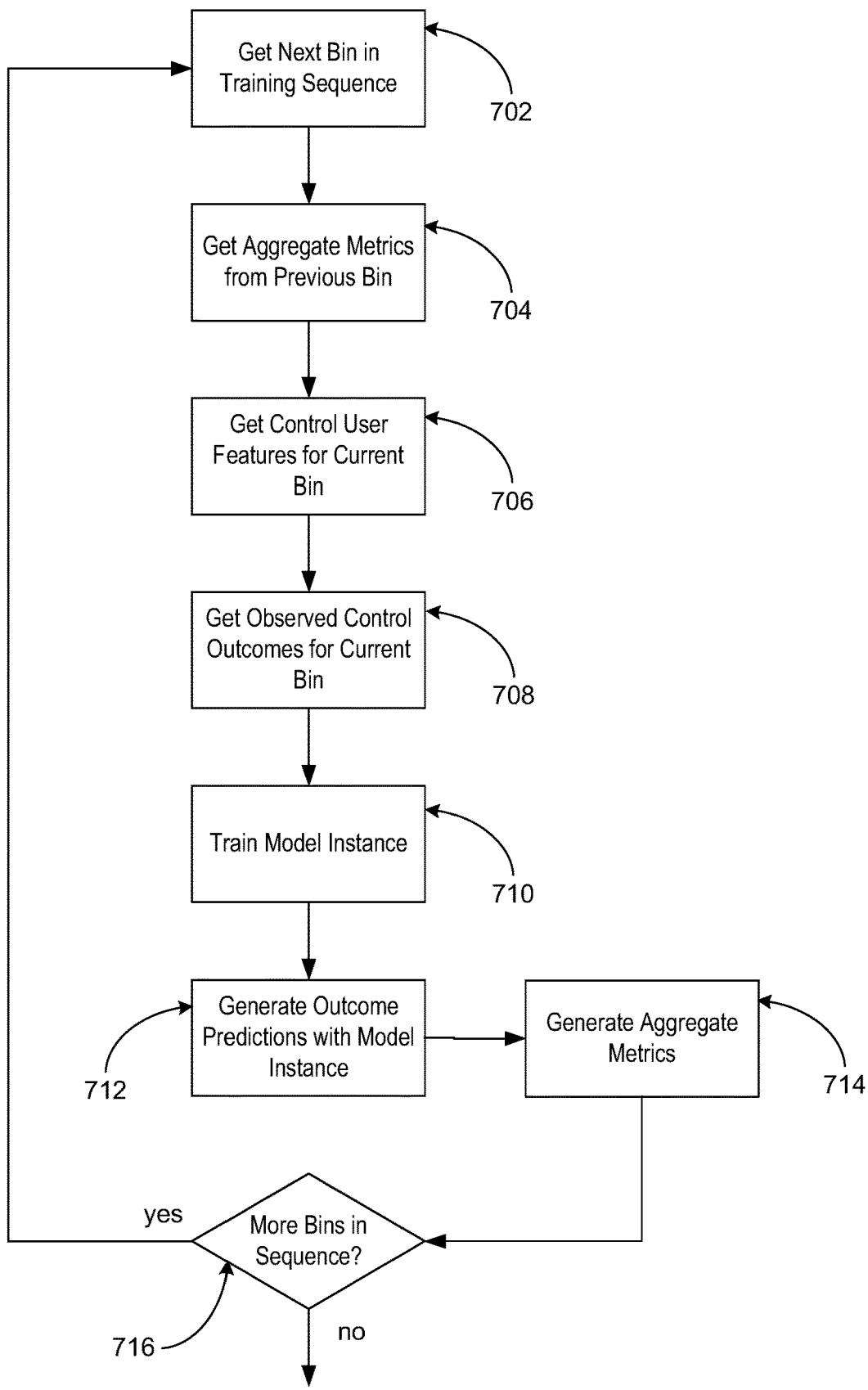
FIG. 7 is a process diagram depicting example operations for model sequence training in accordance with at least one embodiment.

FIG. 7 depicts example operations for model sequence training in accordance with at least one embodiment. At 702, a next bin a training sequence may be identified as the current bin. For example, the nonlinear extrapolation module 206 (FIG. 2) may identify a next (or a first) bin in the training sequence established at 608 (FIG. 6). At 704, aggregate metrics from a previous bin in the sequence (and/or from a previous operation in the training sequence). For example, aggregate metrics on predicted outcomes may be obtained from the aggregator 404 (FIG. 4). At 706, control user features for the current bin may be obtained. For example, the nonlinear extrapolation module 206 may obtain the features for control users assigned to the current bin. At 708, observed control outcomes for the current bin may be obtained. For example, the nonlinear extrapolation module 206 may obtain the observed control outcomes for control users assigned to the current bin.

At 710, a model instance associated with the current bin (and/or the current training sequence operation) may be trained. For example, the model instance 406 may be trained as described above with reference to FIG. 4 using observed outcomes of untreated users in the corresponding propensity bin (from 708) to update the machine learning model given input including (i) features of the untreated users (from 706) and (ii) an aggregate metric on predicted outcomes generated by the machine learning model in a prior training operation of the sequence of training operations (from 704).

At 712, outcome predictions may be generated with the updated model instance. For example, the nonlinear extrapolation module 206 (FIG. 2) may generate the predicted control outcomes for the current bin using the updated model instance 406 (FIG. 4). At 714, aggregate metrics may be generated. For example, the aggregator 408 may generate the aggregate metrics on predicted outcomes based at least in part on the outcome predictions generated at 712.

At 716, it may be determined whether there are more bins in the training sequence. If so, the procedure 700 may progress to 702 to identify a next bin. Otherwise the procedure may progress to operations not depicted in FIG. 7, for example, 612 of FIG. 6.

Some or all of the processes 400, 500, 600, 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 8:
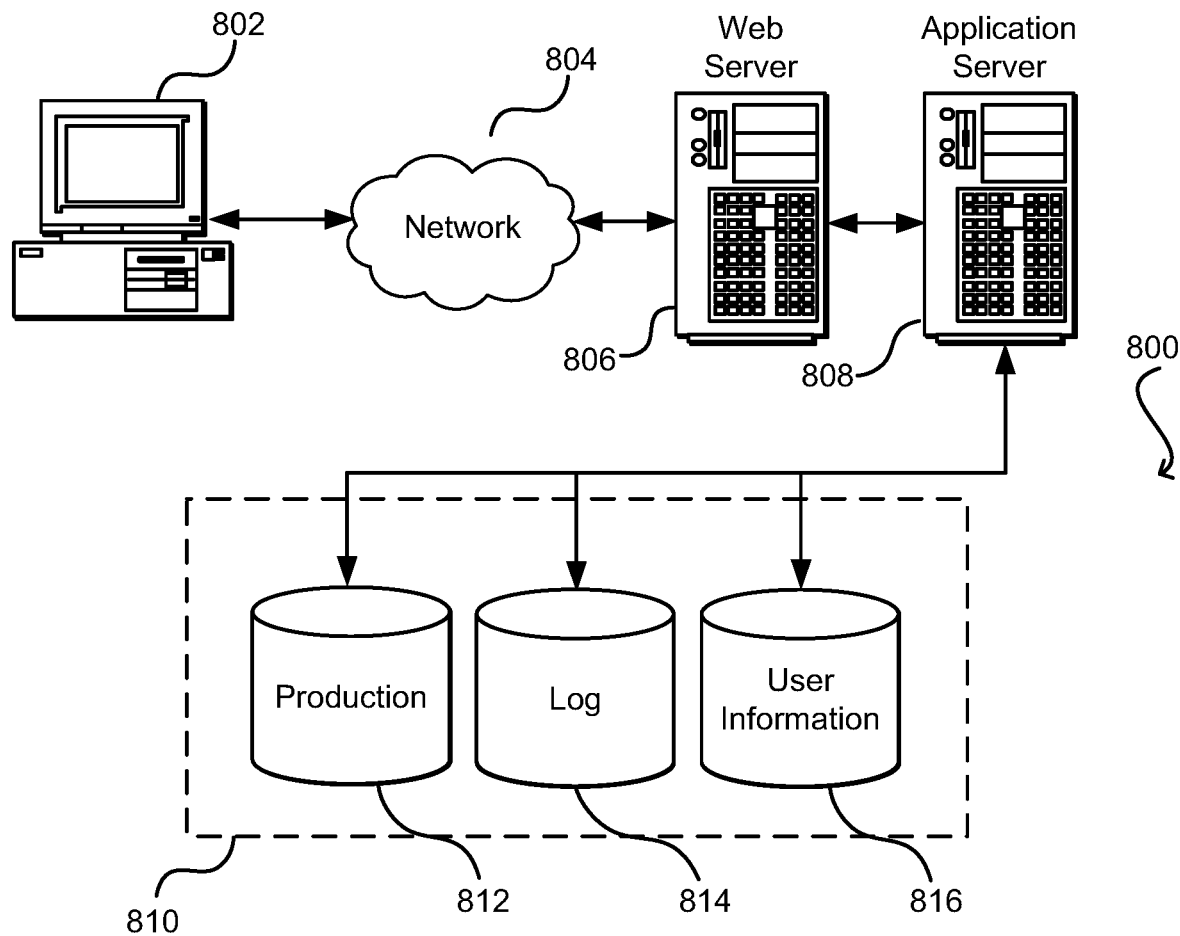
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing treatment candidate ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and/or computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    determining, by a computer system, a propensity score for individual users of a plurality of users, the plurality of users being candidates for a treatment;

partitioning, by the computer system, the plurality of users into a plurality of propensity bins based at least in part on the propensity score determined for individual users of the plurality of users, individual propensity bins of the plurality of propensity bins being associated with a propensity score range;

training, by the computer system, a machine learning model for a selected propensity bin of the plurality of propensity bins at least in part by:
arranging, by the computer system, the plurality of propensity bins into a sequence of propensity bins based at least in part on the propensity score range associated with individual propensity bins of the plurality of propensity bins; and
training, by the computer system, the machine learning model in a sequence of training operations corresponding to the sequence of propensity bins, in individual training operations of the sequence of training operations using observed outcomes of untreated users in the corresponding propensity bin to update the machine learning model given input including (i) features of the untreated users and (ii) an aggregate metric on predicted outcomes generated by the machine learning model in a prior training operation of the sequence of training operations;

generating, by the computer system, a counterfactual prediction for treatment of users in the selected propensity bin using the trained machine learning model given input including (i) features of treated users of the selected propensity bin and (ii) an aggregate metric on predicted outcomes generated by the machine learning model in a training operation of the sequence of training operations; and providing, by the computer system, a representation of the counterfactual prediction for presentation with a user interface.

2. The computer-implemented method of claim 1, wherein selecting the selected propensity bin comprises:
determining a number of untreated users in a candidate propensity bin that match treated user based at least in part on user features; and
determining that the number of untreated users is less than a threshold.

3. The computer-implemented method of claim 1, wherein the counterfactual prediction comprises a nonlinear extrapolation of outcomes for untreated users in one or more prior propensity bins of the sequence of propensity bins.

4. The computer-implemented method of claim 1, further comprising determining a predicted change in outcome of a user in the selected propensity bin based at least in part on the generated counterfactual prediction.

5. A computer-implemented method, comprising:
assigning, by a computer system, a plurality of users into a plurality of propensity bins based at least in part on a propensity score determined for individual users of the plurality of users;
training, by the computer system, a machine learning model in a sequence of training operations corresponding to a sequence of propensity bins, in individual training operations of the sequence of training operations using observed outcomes of untreated users in the corresponding propensity bin to update the machine learning model given input including (i) features of the untreated users and (ii) an aggregate metric on predicted outcomes generated by the machine learning model in a prior training operation of the sequence of training operations;
generating, by the computer system, a predicted outcome for users in a selected propensity bin using the trained machine learning model given input including (i) features of treated users of the selected propensity bin and (ii) an aggregate metric on predicted outcomes generated by the machine learning model in a prior training operation of the sequence of training operations; and
providing, by the computer system, a representation of the predicted outcome for presentation with a user interface.

6. The computer-implemented method of claim 5, wherein determining the propensity score for the user comprises applying a propensity scoring function to a set of features associated with the user.

7. The computer-implemented method of claim 5, wherein the plurality of users interact with a service provider thereby generating a user behavior database and the method further comprises analyzing the user behavior database to determine feature values for individual users of the plurality of users.

8. The computer-implemented method of claim 5, wherein user features include at least one of: geographic, demographic, psychographic, or behavioral features.

9. The computer-implemented method of claim 5, wherein the propensity score quantifies a propensity of the user to participate in a treatment.

10. The computer-implemented method of claim 9, wherein the treatment includes the user ordering an item or interacting with a service.

11. The computer-implemented method of claim 5, wherein the machine learning model comprises a recurrent neural network.

12. The computer-implemented method of claim 5, wherein the sequence of propensity bins includes each of the plurality of propensity bins in order according to a maximum propensity score associated with each propensity bin.

13. The computer-implemented method of claim 5, wherein treatment outcomes include at least one of: a level of user behavior of a particular type, an aggregate statistic associated with user behavior of a particular type during a particular time period, revenue associated with user behavior, profit associated with user behavior, or a level of user sentiment.

14. The computer-implemented method of claim 5, wherein the aggregate metric on predicted outcomes includes at least one of: a statistical summary of predicted outcome values, a mean of predicted outcome values, a median of predicted outcome values, percentiles associated with predicted outcome values, or a standard deviation of predicted outcome values.

15. A computer system, comprising:
a processor;
a memory storing computer-executable instructions that, when executed with the processor, cause the computer system to, at least:
assign a plurality of treatment candidates to a plurality of candidate characterization bins based at least in part on a candidate characterization score determined for individual treatment candidates of the plurality of treatment candidates;
train a machine learning model in a sequence of training operations corresponding to a ordering of candidate characterization bins, in individual training operations of the sequence of training operations using observed outcomes of untreated treatment candidates in the corresponding candidate characterization bin to update the machine learning model given input including (i) features of the untreated treatment candidates and (ii) an aggregate metric on predicted outcomes generated by the machine learning model in a prior training operation of the sequence of training operations;

generate a predicted outcome for treatment candidates in a selected candidate characterization bin using the trained machine learning model given input including (i) features of treated treatment candidates of the selected candidate characterization bin and (ii) an aggregate metric on predicted outcomes generated by the machine learning model in a training operation of the sequence of training operations; and provide a representation of the predicted outcome for presentation with a user interface.

16. The computer system of claim 15, wherein the candidate characterization score corresponds to a likelihood that the treatment candidate will undergo treatment.

17. The computer system of claim 15, wherein the ordering of the candidate characterization bins is based at least in part on corresponding candidate characterization scores of the treatment candidates assigned to the candidate characterization bins.

18. The computer system of claim 15, wherein the computer-executable instructions further cause the computer system to generate the aggregate metric based at least in part on the predicted outcomes generated by the machine learning model in the prior training step of the sequence of training steps.

19. The computer system of claim 15, wherein the plurality of treatment candidates comprise users of a service subject to one or more treatment programs associated with corresponding treatment outcome goals.

20. The computer system of claim 15, wherein the computer-executable instructions further cause the computer system to adjust one or more treatment programs based at least in part on the generated predicted outcome.

* * * * *